United States Patent
Busico et al.

(10) Patent No.: US 9,683,056 B2
(45) Date of Patent: Jun. 20, 2017

(54) ACTIVATING AGENTS FOR HAFNIUM-BASED METALLOCENE COMPONENTS

(71) Applicant: TOTAL RESEARCH & TECHNOLOGY FELUY, Seneffe (Feluy) (BE)

(72) Inventors: Vincenzo Busico, Naples (IT); Roberta Cipullo, Naples (IT); Roberta Pellecchia, Naples (IT); Abbas Razavi, Mons (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

(21) Appl. No.: 14/882,059

(22) Filed: Oct. 13, 2015

(65) Prior Publication Data
US 2016/0032024 A1    Feb. 4, 2016

Related U.S. Application Data

(63) Continuation of application No. 14/498,212, filed on Sep. 26, 2014, now Pat. No. 9,206,274, which is a continuation of application No. 13/902,309, filed on May 24, 2013, now Pat. No. 8,895,466, which is a continuation of application No. 11/665,706, filed as application No. PCT/EP2005/055399 on Oct. 20, 2005, now abandoned.

(30) Foreign Application Priority Data

Oct. 21, 2004    (EP) .................................... 04105219

(51) Int. Cl.
| | | |
|---|---|---|
| *C08F 4/649* | (2006.01) | |
| *C08F 4/6592* | (2006.01) | |
| *C08F 4/642* | (2006.01) | |
| *C08F 10/00* | (2006.01) | |
| *C08F 4/76* | (2006.01) | |
| *C08F 4/659* | (2006.01) | |
| *C08F 110/06* | (2006.01) | |

(52) U.S. Cl.
CPC ............... *C08F 4/76* (2013.01); *C08F 4/649* (2013.01); *C08F 4/6592* (2013.01); *C08F 4/65912* (2013.01); *C08F 4/65927* (2013.01); *C08F 10/00* (2013.01); *C08F 110/06* (2013.01); *Y10S 526/943* (2013.01)

(58) Field of Classification Search
CPC .... C08F 4/649; C08F 4/6592; C08F 4/65912; C08F 4/65916
See application file for complete search history.

(56) References Cited

U.S. PATENT DOCUMENTS

2003/0187158 A1    10/2003    Preuschen et al.

FOREIGN PATENT DOCUMENTS

EP    1496070 A1    1/2005

OTHER PUBLICATIONS

B. Rieger et al., "Ultrahigh Molecular Weight Polypropene Elastomers by High Activity "Dual-Side" Hafnocene Catalysts"; Macromolecules 2002, 35, 5742-5743.

*Primary Examiner* — Caixia Lu
(74) *Attorney, Agent, or Firm* — Albert Shung

(57) ABSTRACT

The present invention discloses an active metallocene catalyst system prepared with a hafnium-based metallocene catalyst system and an activating agent comprising an aluminoxane and a sterically hindered Lewis base.

21 Claims, 2 Drawing Sheets

ACTIVATING AGENTS FOR HAFNIUM-BASED METALLOCENE COMPONENTS

CROSS-REFERENCE TO RELATED APPLICATIONS

This application is a Continuation of U.S. patent application Ser. No. 14/498,212, filed on Sep. 26, 2014, which is a Continuation of U.S. application Ser. No. 13/902,309, filed on May 24, 2013, now issued as U.S. Pat. No. 8,895,466, which is a Continuation of U.S. application Ser. No. 11/665,706, filed on Oct. 3, 2007, now abandoned, which claims is a National Stage Entry of PCT/EP2005/055399, filed on Oct. 20, 2005, which claims priority from EP 04105219.2, filed on Oct. 21, 2004.

This invention relates to the activation of hafnium-based metallocene catalyst components.

Polyolefins such as polyethylenes having a high molecular weight generally have improved mechanical properties over their low molecular weight counterparts.

It has been observed that hafnium-based metallocene catalyst components can be used in catalyst systems that produce homo- and co-polymers of alpha-olefins having very high molecular weight. They also have an excellent response to hydrogen. Their activity is however prohibitively low.

Until recently the low activity of the hafnium-based metallocene catalyst systems was believed to be inherent to the metal property. Recently, Rieger et al (Rieger B., Troll C., and Preuschen J., in Macromolecules 2002, 35, 5742-5743) or Preuschen et al. in US-A-2003/0187158 have shown that the activity of some "dual-site" hafnium-based metallocene catalyst systems may be improved when borates are used as activating agents and when the solvent is propene. These same catalyst systems, when used with methylaluminoxane (MAO) show a very low activity. It was thus concluded from these studies that MAO is an inefficient activating agent for hafnium-based catalyst systems.

There is thus a need to improve the activity of the metallocene catalyst systems comprising hafnium-based catalyst components.

It is an object of the present invention to improve the activity of the metallocene catalyst systems comprising hafnium-based catalyst components.

It is also an aim of the present invention to provide polyolefins having an improved high molecular weight fraction.

It is a further aim of the present invention to provide the use of a hafnium-based metallocene catalyst component to prepare polyolefins with improved mechanical properties Accordingly, the present invention discloses an active catalyst system comprising:
  a hafnium-based catalyst component;
  an activating agent having a low or no co-ordinating capability comprising an aluminoxane and a sterically hindered Lewis base.

When an aluminoxane is used as activating agent, some amount of aluminum alkyl is always simultaneously and inevitably present. Surprisingly, the present inventors have identified that this aluminium alkyl is responsible for the low activity of the hafnium-based metallocene catalyst systems. It is therefore an object of the present invention to provide a method to trap the aluminium alkyl by a chemical agent that is not detrimental to the active cationic species. Such agent is a sterically hindered Lewis base.

The hafnium-based metallocene components of the present invention have a structure according to formula (I):

$$R''(CpR_n)(FluR'_m)Hf\ Q_2 \qquad (I)$$

wherein
  Cp is a cyclopentadienyl ring;
  Flu is a fluorenyl ring;
  each R is the same or different and is hydrogen or a hydrocarbyl radical such as alkyl, alkenyl, aryl, alkylaryl or arylalkyl radical containing from 1 to 20 carbon atoms or two carbon atoms are joined together to form a C4-C6 ring;
  each R' is the same or different and is hydrogen or a hydrocarbyl radical such as alkyl, alkenyl, aryl, alkylaryl or arylalkyl radical containing from 1 to 20 carbon atoms
  R" is a structural bridge between two Cp rings;
  Q is a hydrocarbyl radical such as aryl, alkyl, alkenyl, alkylaryl or arylalkyl radical having from 1 to 20 carbon atoms, a hydrocarboxy radical having from 1 to 20 carbon atoms or a halogen and can be the same or different from each other;
  n is an integer from 0 to 4 and m is an integer from 0 to 8.

By substituted, it is meant that any of the positions on the cyclopentadienyl or on the fluorenyl derivative may comprise a substituent in place of a hydrogen atom.

The type of bridge present between the ligands in the present catalyst component is not particularly limited. Typically R" comprises an alkylidene group having from 1 to 20 carbon atoms, a germanium group (e.g. a dialkyl germanium group), a silicon group (e.g. a dialkyl silicon group), a siloxane group (e.g. a dialkyl siloxane group), an alkyl phosphine group or an amine group. Preferably, the substituent on the bridge comprises a hydrocarbyl radical having at least one carbon, such as a substituted or unsubstituted ethylenyl radical, for example —CH$_2$—CH$_2$— (Et). Most preferably R" is Ph$_2$C, Et or Me$_2$Si.

Q is preferably a halogen and most preferably it is Cl.

The substituent or substituents present on the ligands are not particularly limited. If there is more than one substituent, they can be the same or different. Typically, they are independently selected from a hydrocarbyl group having from 1 to 20 carbon atoms.

The position of the substituent or substituents on the ligands is not particularly limited. The ligands may thus have any substitution pattern including unsubstituted or fully substituted. However, the cyclopentadienyl group is preferably substituted in the 3- and/or 5-positions or in the 2- and/or 4-positions. The fluorenyl group is preferably unsubstituted. If substituted, the substituents are preferably in the 3- and/or 6-positions or in the 2- and/or 7-positions. In this description, position 1 denotes the position on the cyclopentadienyl group that is attached to the bridge.

The type and position of the substituents is determined by the properties sought in the resulting polymer. If a syndiotactic polyolefin is desired, the substituents are selected to confer Cs symmetry to the catalyst component, whereas a C1 or a C2 substitution pattern is selected when isotactic polyolefins are desired.

In another embodiment according to the present invention, the hafnium catalyst component may be described by the formula II $$R''(FluR'_m)X\ Hf\ Q_2 \qquad (II)$$

wherein R", Cp, R' and Q have already been defined and wherein X is an hetero atom ligand with one or two lone pair electrons and selected from the group 15 or 16. Preferably, X is nitrogen, phosphorus oxygen or sulphur and it can be substituted or unsubstituted.

Preferably the metallocene component is a bridged cyclopentadienyl-fluorenyl complex, more preferably it has Cs or C1 symmetry substitution pattern.

When Cs symmetry is desired, both the cyclopentadienyl and the fluorenyl groups are preferably unsubstituted.

When a C1 symmetry is desired, the preferred substituent on the cyclopentadienyl is a in a position distal to the bridgehead position, most preferably it is a methyl or tert-butyl in position 3. The fluorenyl is preferably unsubstituted.

The activating agent has low or no coordinating capability and comprises an aluminoxane and a sterically hindered Lewis base or a compound comprising one or more Lewis basic functionalities. Low coordination capability means that the compound can bind to the metal but is easily displaced by the olefin in the process of polymerisation. The aluminium alkyl that is inevitably associated with the aluminoxane is an electron captor (Lewis acid) and it is neutralised by the addition of an electron donor. The electron donor must be sufficiently bulky not to interfere with the hafnium.

The aluminoxanes are well known and preferably comprise oligomeric linear and/or cyclic alkyl aluminoxanes represented by the formula:

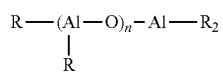  (III)

for oligomeric, linear aluminoxanes and

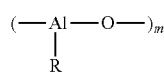  (IV)

for oligomeric, cyclic aluminoxane,
wherein n is 1-40, preferably 10-20, m is 3-40, preferably 3-20 and R is a $C_1$-$C_8$ alkyl group and preferably methyl.

The sterically hindered Lewis base or the compound comprising one or more Lewis basic functionalities can be selected from compounds of formula

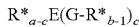

or of formula

wherein G is a group 15 or 16 element of the periodic Table, b is equal to the coordination number of G, E is a group 14 or 15 element of the periodic Table, a is the coordination number of E, c is an integer from 1 to 4, at most equal to a and each R* is independently a hydrogen or an unsubstituted or substituted hydrocarbyl.

Dimeric, trimeric, tetrameric or oligomeric versions of these compounds may also be used.

Suitable compounds that can be used in the present invention are N,N-dimethylaniline, ethylamine, diethylamine, triethylamine, triphenylamine, triphenylphosphine, hexamethylphosphorus triamide, diethylether, ethanol, phenol, thiophenol, 2,6-di-t-butyl-4-methylphenol, tetraethoxysilane, phenyltriethoxysilane, diphenyldiethoxysilane, triphenylethoxysilane, diethyldiethoxysilane.

Preferably, the Lewis base added to the aluminoxane in order to trap the aluminium alkyl is a sterically hindered or multi-substituted phenol.

The aluminoxane and Lewis base are mixed together and left to react for a period of time of from 30 minutes to 2 hours, preferably about one hour in order to reach equilibrium.

The amount of aluminoxane added provides a ratio Al/Hf of from 100 to 5000, preferably of from 500 to 2000.

The productivity of the catalyst system is critically dependent upon the mole ratio R of Lewis base over total aluminium (aluminoxane+aluminium alkyl). Preferably R ranges from 0.5 to 0.9, more preferably from 0.55 to 0.75. If the amount of Lewis base is too large it may act as a poison.

The productivity of the hafnocene-based catalyst system according to the present invention is improved by a factor of at least 20.

The invention also provides a method for homo- or co-polymerising olefins that comprises the steps of:
A. providing a catalyst system comprising a hafnium-based catalyst component, an activating agent comprising an aluminoxane and a sterically hindered Lewis base, and an optional support;
B. introducing the catalyst system in a polymerisation zone containing an olefin monomer and an optional co-monomer;
C. maintaining the reaction zone under polymerisation conditions;
D. extracting the desired polyolefin.

The catalyst system may be employed in a solution polymerisation process, which is homogeneous, or a slurry process, which is heterogeneous. In a solution process, typical solvents include hydrocarbons having from 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefins. Preferably, the support material is an inorganic oxide in its finely divided form.

Suitable inorganic oxide materials that may be employed in accordance with this invention include group IIA, IIIA, IVA, or IVB metal oxides such as silica, alumina and mixtures thereof. Other inorganic oxides that may be employed either alone or in combination with the silica, or alumina are for example magnesia, titania or zirconia. Other suitable support materials comprise for example finely divided functionalised polyolefins such as finely divided polyethylene.

Preferably, the support is a silica support having a specific surface area of from 200 to 700 m$^2$/g and a pore volume of from 0.5 to 3 ml/g.

Alternatively, a fluorinated activating support may be used.

The order of addition of the catalyst components and activating agent to the support material can vary. In accordance with a preferred embodiment of the present invention, the activating agent dissolved in a suitable inert hydrocarbon solvent is added to the support material slurried in the same or another suitable hydrocarbon liquid and thereafter the catalyst components are added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane, cycloalkanes such as cyclopentane, cyclohexane, and aromatics such as benzene, toluene, ethylbenzene and diethylbenzene.

Preferably, the support material is slurried in toluene and the catalyst components and activating agent are dissolved in toluene prior to addition to the support material.

The conditions employed for polymerisation are not particularly limited, provided they are sufficient to effectively polymerise the particular monomer used as a starting material. Polymerisation may take place in the presence of hydrogen and of an alkene co-monomer such as 1-butene or 1-hexene.

Optionally, pre-polymerisation can be carried out.

Preferably the alpha-olefin is propylene.

LIST OF FIGURES

EXAMPLES

Figure 1:
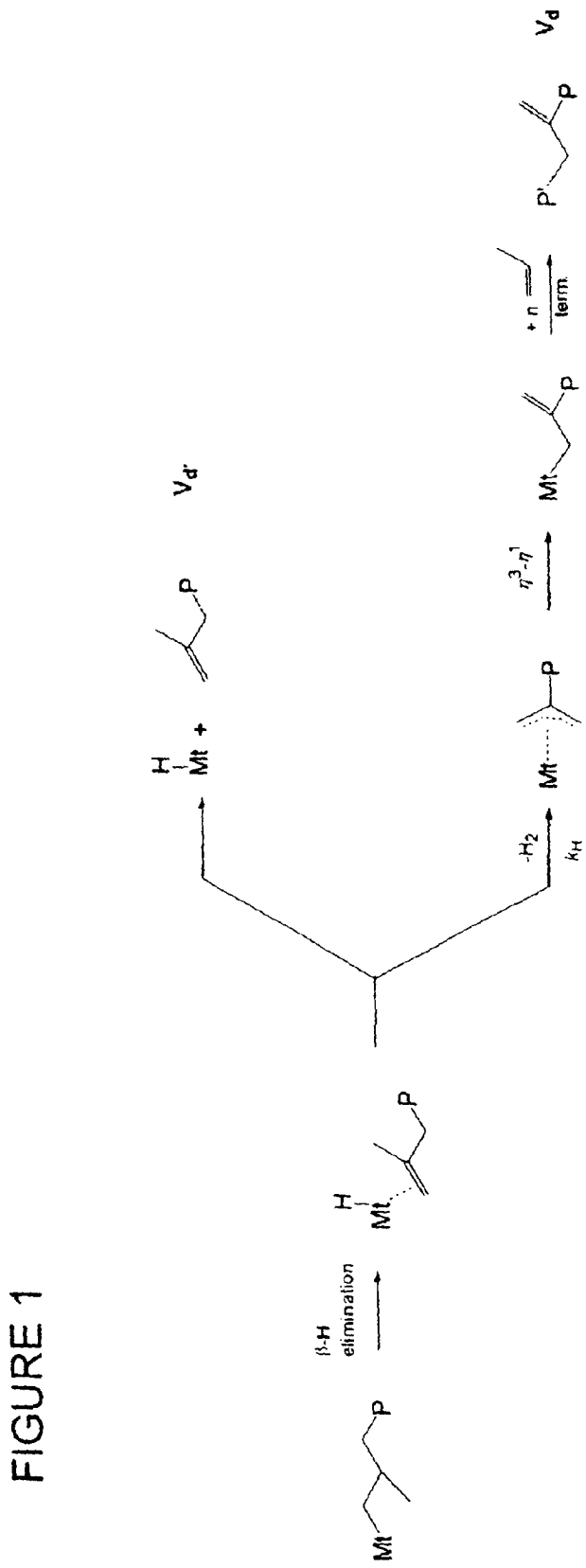
FIG. 1 represents schemes describing the formation of internal and terminal vinilydene unsaturations in a growing polymer chain.

Polymerisation of Propylene with $PH_2C(Cp)(Flu)MCl_2$.

Metal M was selected as Zr and Hf respectively. All polymerisation reactions were carried out at a temperature of 50° C. and with a 0.4M solution of $C_3H_6$ in toluene. The activating agents were respectively methylaluminoxane (MAO) or a mixture MAO/phenol. When MAO was used as activating agent, the ratio [Al]/[M] was of $1.10^3$ and when the mixture MAO/phenol was used as activating agent, the ratio [Al]/[M] was of (1.0 to 1.5). $10^3$ and the ratio [phenol]/[Al] was of 0.6, wherein [Al] represents the total amount of aluminium. The results are displayed in Table I, they include the productivities expressed in $kg_{PP}/\{[C_3H_6]*mol_{Hf}*h\}$ and polymer properties of active site enantioselectivity a, fractional abundance of skipped insertions $P_{sk}$ and viscosity-average molecular mass Mv determined in tetralin at 135° C.

TABLE I

| Metal | Activating agent | Productivity * $10^{-3}$ $kg_{PP}/\{[C_3H_6]*mol_{Hf}*h\}$ | σ | $P_{sk}$ | Mv* |
|---|---|---|---|---|---|
| Zr | MAO | 1.1 | 0.978 | 0.072 | 81000 |
| Zr | MAO/phenol | 2.4 | 0.983 | 0.054 | 410000 |
| Hf | MAO | 0.06 | 0.948 | 0.119 | 16000 |
| Hf | MAO/phenol | 2.1 | 0.941 | 0.082 | 610000 |

It can be seen that the addition of phenol to MAO increases the productivity of both catalyst systems, but the effect was dramatically larger for Hf-based catalyst system than for Zr-based catalyst system. The molecular weight of polypropylene prepared with the hafnium-based catalyst system activated with the mixture MAO/phenol was also considerably larger than that prepared with the zirconium-based catalyst system, all other polymerisation parameters being the same.

Polymerisation of Propylene with $Me_2C(3\text{-}R\text{-}Cp)(Flu)MCl_2$

A first set of polymerisations was carried out with metal M selected as hafnium and with substituent R on the cyclopentadienyl selected as methyl and tert-butyl respectively. All polymerisation reactions were carried out at a temperature of 50° C. and with a 0.4 M solution of propene in toluene. When MAO was used as activating agent, the ratio [Al]/[M] was of $7.10^2$ and when the mixture MAO/phenol was used as activating agent the ratio [Al]/[M] was of $6.10^2$ and the ratio [phenol]/[Al] was of 0.6. The results are reported in Table II.

TABLE II

| Metal | Activating agent | R | Productivity * $10^{-3}$ $kg_{PP}/\{[C_3H_6]*mol_{Hf}*h\}$ |
|---|---|---|---|
| Hf | MAO | Me | 14 |
| Hf | MAO/phenol | Me | 90 |
| Hf | MAO | t-Bu | — |
| Hf | MAO/phenol | t-Bu | 33 |

Additional polymerisations were carried out with metal M selected as hafnium or zirconium and with substituent R on the cyclopentadienyl ring selected as methyl. The polymerisation temperature and propene partial pressure were selected as indicated in Table III. The polymer properties of enantioselectivity at site i, $\sigma_i$ (i=1 or 2), of conditional probability $P_{ij}$ of monomer insertion at site j after a previous insertion at site i (i=1 or 2 and j=1 or 2) are also displayed in Table III. In all polymerisation reactions, the catalyst system was activated with a mixture MAO/phenol having a ratio [phenol]/[Al] of 0.6.

TABLE III

| Metal | Temp. ° C. | Pressure $C_3H_6$ bars | $\sigma_1$ | $P_{12}$ | $\sigma_2$ | $P_{21}$ |
|---|---|---|---|---|---|---|
| Zr | 25 | 1 | 0.98 | 0.9 | 0.44 | 1 |
| Zr | 25 | 8 | 0.99 | 0.97 | 0.44 | 1 |
| Hf | 25 | 1 | 0.95 | 0.82 | 0.5 | 1 |
| Hf | 25 | 8 | 0.95 | 0.98 | 0.52 | 1 |
| Zr | 50 | 1 | 0.97 | 0.66 | 0.43 | 1 |
| Zr | 50 | 8 | 0.98 | 0.9 | 0.45 | 1 |
| Hf | 50 | 1 | 0.91 | 0.66 | 0.56 | 1 |
| Hf | 50 | 4 | 0.956 | 0.82 | 0.51 | 1 |

At a polymerisation temperature of 25° C., the polymers obtained all had a hemiisotactic-like structure and they all exhibited a weak tendency of the growing chain to back skip to the less hindered coordination site upon diluting the monomer. The enantioselectivity of the more open coordination site was lower for the hafnocene (95%) than for the zirconocene (98%) and it was not sensitive to monomer concentration.

At a polymerisation temperature of 50° C., the enantioselectivity of the more open coordination site decreased with decreasing monomer concentration for the hafnocene, whereas it remained unaltered for the zirconocene.

Without wishing to be bound by a theory, this behaviour might be the result of growing chain epimerisation.

The present inventors have reported in European patent application EP-03102060 that the catalyst systems based on catalyst component $Me_2C(3\text{-}^tBu\text{-}Cp)(Flu)ZrCl_2$ generated polypropylene with an unprecedently high level of internal chain unsaturations. These internal chain unsaturations were attributed to β-H elimination followed by allylic chain activation as summarised in FIG. 1.

Figure 2:
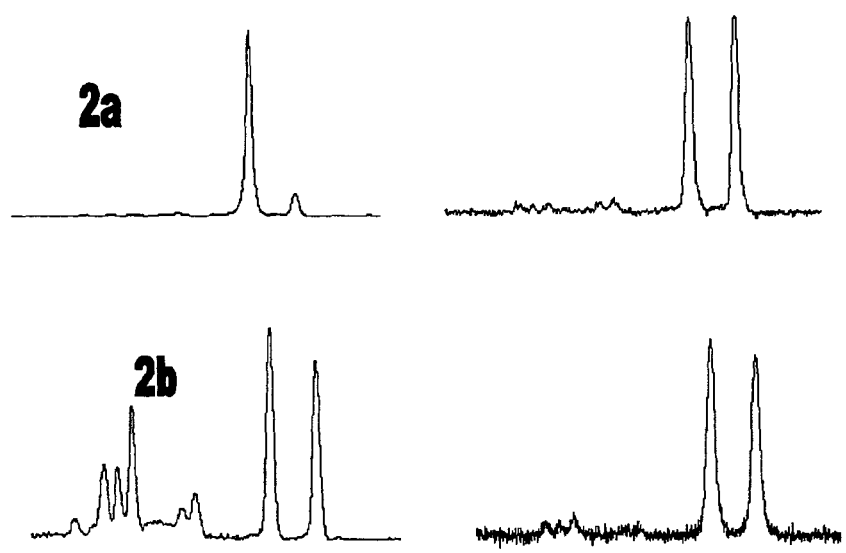
FIG. 2 represents the $^1$H NMR spectra of polypropylene samples prepared with $Me_2C(3\text{-}^tBu\text{-}Cp)(Flu)MCl_2$ wherein M is Zr (2a) or Hf (2b)

The hafnocenes of the present invention did not exhibit the tendency to produce internal unsaturations. Their NMR spectrum indicated on the contrary a majority of terminal unsaturations. The $^1$H NMR spectra in the olefinic region of 400 MHz were recorded for the polymer samples prepared in toluene with $Me_2C(3\text{-}^tBu\text{-}Cp)(Flu)MCl_2$ wherein M is Zr or Hf. They are represented in FIGS. 2a and 2b respectively. It can be seen from these spectra that the samples prepared with the zirconocene (2a) have truly internal vinylidene unsaturations, whereas those prepared with the hafnocene (2b) show the two peaks characteristic of terminal vinylidene unsaturations and additionally a complex pattern at 5.0-5.1 ppm that could represent a terminal vinyl.

The invention claimed is:

1. A method comprising:
preparing a metallocene catalyst system by combining a hafnium-based metallocene catalyst component and an activating agent;
wherein the hafnium-based metallocene catalyst component is of formula II

R" (FluR'$_m$)X Hf Q$_2$    (II)

wherein Flu is a fluorenyl ring; wherein each R' is the same or different and is hydrogen or a hydrocarbyl radical containing from 1 to 20 carbon atoms; wherein m is an integer from 0 to 8; wherein each Q is a hydrocarbyl radical having from 1 to 20 carbon atoms, a hydrocarboxy radical having from 1 to 20 carbon atoms or a halogen and can be the same or different from each other; wherein X is a hetero atom ligand with one or two lone pair electrons and is selected from group 16; and wherein R" is a structural bridge between Flu and X;
wherein the activating agent has a low or no co-ordinating capability and comprises an aluminoxane and a Lewis base, and wherein the activating agent comprises a ratio of Lewis base to total aluminum of from 0.5:1 to 0.9:1; and
wherein prior to the combining of the hafnium-based metallocene catalyst component and the activating agent, forming the activating agent by:
mixing the aluminoxane with the Lewis base; and
reacting the aluminoxane and the Lewis base for a period of time sufficient to reach equilibrium, wherein aluminum alkyl present in the activating agent is neutralized by the Lewis base.

2. The method of claim 1, wherein the period of time sufficient to reach equilibrium ranges from 30 minutes to 2 hours.

3. The method of claim 1, wherein the activating agent comprises a ratio of Lewis base to total aluminum of from 0.55:1 to 0.75:1.

4. The method of claim 1, wherein the Lewis base is a compound of formula R*$_{a-c}$ E (G-R*$_{b-1}$)$_c$ or of formula R*(G-R*$_{b-1}$)$_c$ wherein G is a group 15 or 16 element of the Periodic Table, b is equal to the valency of G, E is a group 14 or 15 element of the Periodic Table, a is the coordination number of E, c is an integer from 1 to 4, at most equal to a and each R* is independently a hydrogen or an unsubstituted or substituted hydrocarbyl.

5. The method of claim 1, wherein the Lewis base is N,N-dimethylaniline, ethylamine; diethylamine; trimethylamine; triphenylamine; triphenylphosphine; hexamethylphosphorus triamide; diethylether; ethanol; phenol; thiophenol, 2,6-di-t-butyl-4-methylphenol; tetraethoxysilane; phenyltriethoxysilane; diphenyldiethoxysilane; triphenylethoxysilane; or diethyldiethoxysilane.

6. The method of claim 1, wherein the Lewis base is a phenol.

7. The method of claim 6, wherein the phenol is a sterically hindered phenol.

8. The method of claim 6, wherein the phenol is a multi-substituted phenol.

9. The method of claim 1, wherein the hafnium-based metallocene catalyst component and the activating agent are combined with a support material.

10. The method of claim 9, wherein the activating agent is contacted with the support material prior to the hafnium-based metallocene catalyst component.

11. The method of claim 9, wherein combining the hafnium-based metallocene catalyst component and the activating agent with the support material comprises:
providing the activating agent dissolved in an inert hydrocarbon solvent;
providing the support material slurried in the same inert hydrocarbon solvent as the activating agent or in another inert hydrocarbon solvent;
adding the activating agent to the support material;
after adding the activating agent to the support material, adding the hafnium-based metallocene catalyst component to the activating agent and the support material.

12. The method of claim 1, wherein R" is an alkylidene group having from 1 to 20 carbon atoms, a germanium group, a silicon group, a siloxane group, an alkyl phosphine group, or an amine group.

13. The method of claim 1, wherein R" is a hydrocarbyl radical having at least one carbon.

14. The method of claim 1, wherein R" is CH$_2$—CH$_2$, Ph$_2$C, or Me$_2$Si.

15. The method of claim 1, wherein Q is a halogen.

16. The method of claim 15, wherein Q is Cl.

17. The method of claim 1, wherein X is oxygen or sulphur.

18. The method of claim 1, wherein the hafnium-based metallocene catalyst component is a bridged cyclopentadienyl-fluorenyl complex that has a Cs or C1 symmetry.

19. The method of claim 1, wherein the metallocene catalyst system has a ratio Al/Hf of from 100 to 5000.

20. The method of claim 1, wherein the metallocene catalyst system has a ratio Al/Hf of from 500 to 2000.

21. A method comprising:
mixing an aluminoxane containing aluminum alkyl with a Lewis base, wherein the Lewis base is a multi-substituted phenol;
reacting the aluminoxane and the Lewis base for a period of time sufficient to reach equilibrium, wherein the aluminum alkyl is neutralized by the Lewis base, to obtain an activating agent comprising the aluminoxane and the Lewis base;
combining a hafnium-based metallocene catalyst component and the activating agent;
wherein the hafnium-based metallocene catalyst component is of formula II

R" (FluR'$_m$)X Hf Q$_2$    (II)

wherein Flu is a fluorenyl ring; wherein each R' is the same or different and is hydrogen or a hydrocarbyl radical containing from 1 to 20 carbon atoms; wherein m is an integer from 0 to 8; wherein each Q is a hydrocarbyl radical having from 1 to 20 carbon atoms, a hydrocarboxy radical having from 1 to 20 carbon atoms or a halogen and can be the same or different from each other; wherein X is a hetero atom ligand with one or two lone pair electrons and is selected from group 16; and wherein R" is a structural bridge between Flu and X;
wherein the activating agent has a low or no co-ordinating capability, and wherein the activating agent comprises a ratio of Lewis base to total aluminum of from 0.55:1 to 0.75:1.

* * * * *